United States Patent
Nguyen et al.

(10) Patent No.: US 9,965,860 B2
(45) Date of Patent: May 8, 2018

(54) METHOD AND DEVICE FOR CALIBRATION-FREE GAZE ESTIMATION

(71) Applicant: THOMSON LICENSING, Issy de Moulineaux (FR)

(72) Inventors: Phi Bang Nguyen, Rennes (FR); Julien Fleureau, Rennes (FR); Christel Chamaret, Chantepie (FR); Philippe Guillotel, Vern sur Seiche (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 165 days.

(21) Appl. No.: 14/769,814

(22) PCT Filed: Feb. 20, 2014

(86) PCT No.: PCT/EP2014/053349
§ 371 (c)(1),
(2) Date: Aug. 23, 2015

(87) PCT Pub. No.: WO2014/131690
PCT Pub. Date: Sep. 4, 2014

(65) Prior Publication Data
US 2016/0005176 A1 Jan. 7, 2016

(30) Foreign Application Priority Data

Feb. 27, 2013 (EP) ..................... 13305219
Sep. 30, 2013 (EP) ..................... 13306351

(51) Int. Cl.
*G06K 9/00* (2006.01)
*G06T 7/00* (2017.01)
(Continued)

(52) U.S. Cl.
CPC ............ *G06T 7/0044* (2013.01); *G06F 3/013* (2013.01); *G06K 9/00597* (2013.01);
(Continued)

(58) Field of Classification Search
CPC .......... G06T 7/0044; G06T 7/74; G06T 7/90; G06T 7/20; G06T 2207/10016;
(Continued)

(56) References Cited

U.S. PATENT DOCUMENTS

| 3,069,654 A | 12/1962 | Hough | |
|---|---|---|---|
| 6,246,779 B1 * | 6/2001 | Fukui | ................ G06K 9/00268 382/100 |
| 2012/0262473 A1 * | 10/2012 | Kim | .................. H04N 1/40006 345/589 |

FOREIGN PATENT DOCUMENTS

WO    WO2013059940    * 5/2013    ......... G06K 9/00604

OTHER PUBLICATIONS

Tobii Technology, Inc.: Solutions for eye tracking https://web.archive.org/webt20130127033428/http://www.tobii.com/en/eye-tracking-integration_global_products-sevices; downloaded on Nov. 27, 2015.

(Continued)

*Primary Examiner* — Shefali Goradia
(74) *Attorney, Agent, or Firm* — Meagher Emanuel Laks Goldberg & Liao, LLP

(57) ABSTRACT

The invention relates to a method of gaze estimation. As to determine the position of the gaze without calibrating the system used for determining the gaze, the method comprises: detecting at least a location of the center of at least an eye on at least an eye image of a viewer watching at least a video image displayed on a screen; determining at least a first position of the gaze of the viewer on the screen by using the at least a detected location of the center of the at least an eye and a mapping function based on center-bias property of human gaze distribution. The invention also relates to a device configured for estimating the gaze.

17 Claims, 6 Drawing Sheets

(51) Int. Cl.
| | |
|---|---|
| *G06F 3/01* | (2006.01) |
| *G06K 9/46* | (2006.01) |
| *G06T 7/20* | (2017.01) |
| *G06T 7/73* | (2017.01) |
| *G06T 7/90* | (2017.01) |

(52) U.S. Cl.
CPC ....... *G06K 9/00604* (2013.01); *G06K 9/4671* (2013.01); *G06T 7/20* (2013.01); *G06T 7/74* (2017.01); *G06T 7/90* (2017.01); *G06T 2207/10016* (2013.01); *G06T 2207/10024* (2013.01); *G06T 2207/20024* (2013.01); *G06T 2207/20061* (2013.01); *G06T 2207/30201* (2013.01)

(58) Field of Classification Search
CPC . G06T 2207/10024; G06T 2207/20024; G06T 2207/20061; G06T 2207/30201; G06F 3/013; G06K 9/00597; G06K 9/00604; G06K 9/4671
See application file for complete search history.

(56) References Cited

OTHER PUBLICATIONS

Tohru Yagi: "Eye-gaze Interfaces using Electro-oculography (EOG)" EGIHMI '10 Proceedings of the 2010 workshop on Eye gaze in intelligent human machine interaction, pp. 28-32, Hong Kong, China—Feb. 7-7, 2010.
Zhaozheng Yin, Fatih Porikli, Robert Collins: "Likelihood Map Fusion for Visual Object Tracking" IEEE Winter Vorkshop on Application of Computer Vision 2008.
Richard A. Young: "Oh say, can you see? The physiology of vision" SPIE Proceedings vol. 1453, Jun. 1, 1991.
Nguyen Et Etal: "Calibration Free Gaze Tracking Using Particle Filter"; 82013 IEEE International Conference on Multimedia and EXPO (ICME), IEEE, Jul. 15, 2013, pp. 1-6.
Geetha et al: "Facial Expression Recognition-A Real Time Approach"; Expert Systems With Applications, vol. 36, N°1, Jan. 1, 2009, pp. 303-308.
Sheela: "An Appearance Based Method for Eye Gaze Tracking"; Journal of Computer Science; vol. 7, N°8, Aug. 1, 2011, pp. 1194-1203.
Lakshmanan: "Object Identification—Part 2—MET 5970; Automated Analysis of Spatial Grides"; Feb. 26 2013; pp. 1-22.
Miyazato et al: "Real-Time Estimation of Human Visual Attention With Dynamic Bayesian Network and MCMC-Base Particle Filter"; Multimedia and EXPO, 2009, ICME 2009, IEEE, International Conference on, IEEE, Jun. 28, 2009, pp. 250-257.
Sugano et al: "Appearance Based Gaze Estimation Using Visual Saliency"; IEEE Transactions on Pattern Analysis and Machine Intelligence; May 1, 2012;pp. 1-14.
Lakshmanan: "Object Identification—Part 1—MET 5970; Automated Analysis of Spatial Grids"; Feb. 26, 2013; pp. 1-54.
Hsu et al: "Face Detection in Color Images"; IEEE Transactions on Pattern Analysis and Machine Intelligence; vol. 24, N°5, May 1, 2002, pp. 696-706.
Search Report dated May 16, 2014.
Sileye O. Ba and Jean-Marc Odobez, "Recognizing Visual Focus of Attention from Head Pose in Natural Meetings" IEEE Transactions on Systems, Man, and Cybernetics, Part B: Cybernetics—Special issue on human computing archive, vol. 39, Issue 1, pp. 16-33, Feb. 2009.
Shuo Chen and Chengjun Liu, "Fast Eye Detection Using Different Color Spaces", Systems, Man, and Cybernetics (SMC), 2011 IEEE International Conference, Oct. 9-12, 2011.
Jixu Chen and Qiang Ji: "Probabilistic Gaze Estimation Without Active Personal Calibration", Proceeding CVPR '11 Proceedings of the 2011 IEEE Conference on Computer Vision and Pattern Recognition, pp. 609-616, Jun. 20-25, 2011.
Julien Fleureau, Arnaud Leroy & Philippe Guillotel: "EOG-Based Gaze Position Estimation and Comparison With A Commercial Video-Based Eye-Tracker" Poster, pdf created Aug. 18, 2011.
Athinodoros S. Georghiades and Peter N. Belhumeur: "From Few to Many: Illumination Cone Models for Face Recognition Under Variable Lighting and Pose" IEEE Transactions on Pattern Analysis and Machine Intelligence, vol. 23, No. 6, Jun. 2001.
Elias Daniel Guestrin: "General Theory of Remote Gaze Estimation Using the Pupil Center and Corneal Reflections" IEEE Transactions on Biomedical Engineering, vol. 53, No. 6, Jun. 2006.
Elias Daniel Guestrin: "Remote Point-of-Gaze Estimation with Free Head Movements Requiring a Single-Point Calibration" Proceedings of the 29th Annual International Conference of the IEEE EMBS, Cité Internationale, Lyon, France, Aug. 23-26, 2007.
Dan Witzner Hansen: "In the Eye of the Beholder: A Survey of Models for Eyes and Gaze" IEEE Trans Pattern Anal Mach Intell. vol. 32, No. 3, pp. 478-500, Mar. 2010.
Thomas E. Hutchinson, K. Preston White, Jr., Worthy N. Martin, Kelly C. Reichert, and Lisa A. Frey: "Human—Computer Interaction Using Eye-Gaze Input" IEEE Transactions on Systems, Man, and Cybernetics, vol. 19, No. 6, Nov./Dec. 1989.
Michael Isard and Andrew Blake: "CONDENSATION—Conditional Density Propagation for Visual Tracking" International Journal of Computer Vision 29(1), 5-28 (1998).
Oliver Jesorsky, Klaus J. Kirchberg, and Robert W. Frischholz: "Robust Face Detection Using the Hausdorff Distance" In Proc. Third International Conference on Audio- and Video-based Biometric Person Authentication, Springer, Lecture Votes in Computer Science, LNCS-2091, pp. 90-95, Halmstad, Sweden, Jun. 6-8, 2001.
Tilke Judd, Krista Ehinger, Fredo Durand and Antonio Torralba: "Learning to Predict Where Humans Look" International Conference on Computer Vision (ICCV) 2009.
Nahum Kiryati: "Randomized or Probabilistic Hough Transform: Unified Performance Evaluation" Pattern Recognition Letters, vol. 21, pp. 1157-1164, 1999.
C. Koch and S. Ullman: "Shifts in selective visual attention: towards the underlying neural circuitry" Human Neurobiol (1985) 4:219-227.
Olivier Le Meur, Patrick Le Callet, Dominique Barba,and Dominique Thoreau: "A Coherent Computational Approach to Model Bottom-Up Visual Attention" IEEE Transactions on Pattern Analysis and Machine Intelligence, vol. 28, No. 5, May 2006.
Le Meur, O. et al., "Predicting visual fixations on video based on low-level visual features", Vision Research (2007), doi:10.1016/j.visres.2007.06.015.
Javier San Agustin Lopez: "Off-the-Shelf Gaze Interaction" Dissertation, The IT University of Copenhagen 2009.
John J. Magee, Margrit Betke, James Gips, Matthew R. Scott, and Benjamin N. Waber: "A Human—Computer Interface Using Symmetry Between Eyes to Detect Gaze Direction" IEEE Transactions on Systems, Man, and Cybernetics—Part A: Systems and Humans, vol. 38, No. 6, Nov. 2008.
Atsuto Maki, Jan-Olof Eklundh and Peter Nordlund: "A Computational Model of Depth-Based Attention" Pattern Recognition, 1996., Proceedings of the 13th International Conference on, vol. 4, Sep. 1996.
Sophie Marat, Anis Rahman, Denis Pellerin, Nathalie Guyader and Dominique Houzet: "Improving Visual Saliency by Adding 'Face Feature Map' and 'Center Bias'" Cognitive Computation, vol. 5, pp. 63-75, 2012.
Dmitri Model, and Moshe Eizenman: "An Automatic Personal Calibration Procedure for Advanced Gaze Estimation Fystems" IEEE Transactions on Biomedical Engineering, vol. 57, No. 5, pp. 1031-1039, May 2010.
Dmitri Model, and Moshe Eizenman: "User-Calibration-Free Remote Gaze Estimation System" ETRA 2010, Austin, TX, Mar. 22-24, 2010.
Lili Pan, Wen-Sheng Chu, Jason M. Saragih, Fernando De la Torre: "Fast and Robust Circular Object Detection with Probabilistic

(56) References Cited

OTHER PUBLICATIONS

Pairwise Voting (PPV)" IEEE Signal Processing Letters, vol. 18, Issue: 11, pp. 639-642, Nov. 2011.
P. Jonathon Phillips, Patrick J. Flynn, Todd Scruggs, Kevin W. Bowyer, Jin Chang, Kevin Hoffman, Joe Marques, Jaesik Min, William Worek: "Overview of the Face Recognition Grand Challenge" Proceeding CVPR '05 Proceedings of the 2005 IEEE Computer Society Conference on Computer Vision and Pattern Recognition (CVPR'05)—vol. 1-vol. 01, pp. 947-954, Jun. 20-26, 2005.
P. Jonathon Phillips, Hyeonjoon Moon, Syed A. Rizvi, and Patrick J. Rauss: "The FERET Evaluation Methodology for Face-Recognition Algorithms" Computer Vision and Pattern Recognition, 1997. Proceedings., 1997 IEEE Computer Society Conference on Jun. 17-19, 1997.
Dean Pomerleau & Shumeet Baluja: "Non-Intrusive Gaze Tracking Using Artificial Neural Networks" AAAI Technical Report FS-93-04. Compilation copyright © 1993, AAAI (www.aaai.org).
Sam T. Roweis and Lawrence K. Saul: "Nonlinear Dimensionality Reduction by Locally Linear Embedding" Science 290, 2323 (2000).
A. J. Seyler and Z. L. Budrikis: "Detail Perception after Scene Changes in Television Image Presentations" IEEE Transactions on Information Theory 11(1):31-43•Feb. 1965.
Sheng-Wen Shih, and Jin Liu: "A Novel Approach to 3-D Gaze Tracking Using Stereo Cameras" IEEE Transactions on Systems, Man, and Cybernetics—Part B: Cybernetics, vol. 34, No. 1, Feb. 2004.
Franco Simini, Andrés Touya, Agustín Senatore and José Pereira: "Gaze Tracker by Electrooculography (EOG) on a Head-Band" Biomedical Engineering, 2011 10th International Workshop on Oct. 5-7, 2011.
R S Stephens: "A Probabilistic Approach to the Hough Transform" Image and Vision Computing, vol. 9, Issue 1, pp. 66-71, Feb. 1991.
Yusuke Sugano, Yasuyuki Matsushita, Yoichi Sato, and Hideki Koike: "An Incremental Learning Method for Unconstrained Gaze Estimation" ECCV 2008, Part III, LNCS 5304, pp. 656-667, 2008.
Yusuke Sugano, Yasuyuki Matsushita, and Yoichi Sato: "Appearance-based Gaze Estimation using Visual Saliency" IEEE Transactions on Pattern Analysis and Machine Intelligence Feb. 2013;35(2):329-41.
Yusuke Sugano, Yasuyuki Matsushita, and Yoichi Sato: "Calibration-free gaze sensing using saliency maps" Computer Vision and Pattern Recognition (CVPR), 2010 IEEE Conference on Jun. 13-18, 2010.
Kar-Han Tan, David J Kriegman, Narendra Ahuja: "Appearance-based Eye Gaze Estimation" WACV '02 Proceedings of the Sixth IEEE Workshop on Applications of Computer Vision, p. 191, Dec. 3-4, 2002.
Anne M. Treisman, and Garry Gelade: "A Feature-Integration Theory of Attention" Cognitive Psychology 12, 97-136 (1980).
Po-He Tseng, Ran Carmi, Ian G. M. Cameron, Douglas P. Munoz, Laurent Itti: "Quantifying center bias of observers in free viewing of dynamic natural scenes" Journal of Vision (2009) 9(7):4, 1-16.
Roberto Valenti, and Theo Gevers: "Accurate Eye Center Location and Tracking Using Isophote Curvature" Computer Vision and Pattern Recognition, 2008. CVPR 2008. IEEE Conference on Jun. 23-28, 2008.
Roberto Valenti, and Theo Gevers: "Accurate Eye Center Location through Invariant Isocentric Patterns" IEEE Trans Pattern Anal Mach Intell. Sep. 2012;34(9):1785-98. doi: 10.1109/TPAMI.2011.251.
Roberto Valenti, and Theo Gevers: "Combining Head Pose and Eye Location Information for Gaze Estimation" IEEE Transactions on Image Processing, vol. 21, No. 2, Feb. 2012.
Roberto Valenti, Jacopo Staiano, Nicu Sebe, Theo Gevers: "Webcam-based Visual Gaze Estimation" Book Chapter in Image Analysis and Processing—ICIAP 2009; vol. 5716 of the series Lecture Notes in Computer Science pp. 662-671, 2009.
Roberto Valenti, Nicu Sebe, Theo Gevers: "What Are You Looking at? Improving Visual Gaze Estimation by Saliency" International Journal of Computer Vision, Jul. 2012, vol. 98, Issue 3, pp. 324-334.
Paul Viola and Michael Jones: "Robust Real-time Object Detection" Second International Workshop on Statistical and Computational Theories of Vision—Modeling, Learning, Computing, and Sampling; Vancouver, Canada, Jul. 13, 2001.
Vlin Wang, Jia Li, Tiejun Huang, Yonghong Tian, Lingyu Duan, Guochen Jia: "Saliency Detection Based on 2D Log-Gabor Wavelets and Center Bias" MM '10 Proceedings of the 18th ACM international conference on Multimedia pp. 979-982, Firenze, Italy—Oct. 25-29, 2010.
Jian-Gang Wang and Eric Sung: "Study on Eye Gaze Estimation" IEEE Transactions on Systems, Man, and Cybernetics—Part B: Cybernetics, vol. 32, No. 3, Jun. 2002.
Oliver Williams, Andrew Blake, Roberto Cipolla: "Sparse and Semi-supervised Visual Mapping with the S3GP" Computer Vision and Pattern Recognition, 2006 IEEE Computer Society Conference on Jun. 17-22, 2006.
Yi Wu, Erik Blasch, Genshe Chen, Li Bai, Haibin Ling: "Multiple Source Data Fusion via Sparse Representation for Robust Visual Tracking" in International Conference on Information Fusion (FUSION), 2011.
Senso Motoric Instruments: www.smivision.com_en_gaze-and-eye-tracking-systems_products_red_red250_red500; downloaded on Nov. 5, 2015.
EyeLink: "EyeLink 1000. Multiple Eye Tracking solutions in One" http://www.sr-research.com/EL_1000.html downloaded on Nov. 6, 2015.
EyeLink: "EyeLink II" http://www.sr-research.com/EL_II.html; downloaded on Nov. 5, 2015.
Guestrin et al. "Analysis of Subject-Dependent Point-of-Gaze Estimation Bias in the Cross-Ratios Method", ETRA 2008, Savannah, Georgia, US, Mar. 26-28, 2008, pp. 237-244.

* cited by examiner

METHOD AND DEVICE FOR CALIBRATION-FREE GAZE ESTIMATION

This application claims the benefit, under 35 U.S.C. § 365 of International Application PCT/EP2014/053349, filed Feb. 20, 2014, which was published in accordance with PCT Article 21(2) on Sep. 4, 2014 in English and which claims the benefit of European patent application No. 13305219.1 filed Feb. 27, 2013 and 13306351.1 filed Sep. 30, 2013.

1. DOMAIN OF THE INVENTION

The invention relates to the domain of eye gaze estimation with regard to a sequence of images watched by a viewer.

2. PRIOR ART

Human is the most central factor in all fields of life. Vision is the most essential sense of human-being; about 80-90% of neurons in the human brain are assumed to be involved in visual perception. Eye gaze is considered as an important cue that may reveal useful and irrefutable information from the human mind. The eye gaze is believed to reflect the attention, the behavior and somehow, the emotion of a person within a visual context. In practice, the process of interpretation of eye gaze may be involved in various applications of Human Computer Interaction (HCI) as gaze-based interactive user interfaces, adaptive and interactive content presentation, virtual reality, human behavior study and diagnostic applications, etc. Therefore, eye gaze estimation has become an active research domain during the last several decades but remains a challenging topic due to different difficult aspects of the problem. eye gaze trackers can be generally classified into two categories: intrusive and remote systems according to the way the equipments make contact with the subject. One of the earliest intrusive gaze tracker is based on special contact lens fixed on the eyes that allow to detect its position. These contact lenses contain a sensor (a mirror or an induction coil) that is used to reflect light or to measure the eye position in a high-frequency electro-magnetic field. Although providing high accuracy, this method is only suited for medical or cognitive studies due to its uncomfortable and obtrusive use. Electrooculography (EOG) based methods make use of the fact that an electrostatic field exists when eyes rotate. By measuring the electric potential differences of the skin regions around the eyes (with electrodes), the position of the eye can be estimated. EOG technique provides a reliable measurement with simple configuration which enables recording in dark environment (where video-oculography is useless) and which doesn't require the eyes to be opened. The major problem is that the EOG signal suffers from noise due to eye blinking, movement of facial muscles and EOG potential drift (especially in long recording experiments). Video-oculography techniques can also be classified as intrusive methods if they are used in a head-mounted system. In general, an intrusive method allows a high accuracy and free head movement but the main drawback is that it requires close contact to the user that is only restricted to laboratory experiments.

For everyday applications, nonintrusive (or remote) methods are therefore much more preferred. For this category, video-based techniques are the most widely used. We can distinguish two groups of methods: (geometric) model-based and appearance-based methods. The former uses 3D geometric models of the eye to estimate the gaze. The point of regard is determined as the intersection between the 3D gaze direction (composed of the optical axis and the visual axis) and the screen plane. Majority of model-based methods are based on the corneal reflection technique with the use of additional light sources, generally infrared light, to illuminate the eyes. The main idea is to estimate the gaze from the relative position between the pupil center and the glint—the brightest light spot on the eye due to reflection.

In contrast, appearance based methods consider the gaze estimation as a 2D mapping problem between the image features of the eyes and the positions of the gaze on the screen. The mapping function can be found by training a multi-layer neural network, or a regression model like Gaussian process regression or by using a non-linear manifold embedding technique such as Locally Linear Embedding to reduce the high dimensional eye image to 2 dimensions and derive the gaze by linear combination in the low-dimensional space.

Geometric model based approach is generally more accurate (less than one degree) and widely used in commercial eye tracker. However, it requires high resolution camera and additional light sources. Current appearance-based methods are known to be less accurate (with an accuracy of several degrees). More accurate appearance-based methods are known, which can achieve less than one degree of accuracy but with the expense of using extensive calibration points, e.g. disclosed by K. H. Tan, D. J. Kriegman, and N. Ahuja, "Appearance-based eye gaze estimation", Proceedings of the Sixth IEEE Workshop on Applications of Computer Vision (WACV), pages 191-195, 2002.

Almost all current gaze tracking techniques require a calibration process in order to infer certain person-specific eye parameters (in case of geometric based methods) or to regress the corresponding mapping function between the eye movement and the screen (in case of appearance-based methods). Such a process is quite cumbersome, uncomfortable and difficult to be done. Moreover, in some consumer home applications such as interactive game interfaces or adaptive content selection interfaces, active calibration is almost impossible because the eye tracking is required to be transparent to users. Eye gaze estimation methods that do not require explicit calibration exist. However, their model-based method requires multiple cameras and IR light sources.

Another approach focused on using visual saliency as a prior information of the probability distribution of gaze. Y. Sugano, Y. Matsushita, and Y. Sato, "Calibration-free gaze sensing using saliency maps", In Proc. of the 23rd IEEE Conference on Computer, Vision and Pattern Recognition (CVPR), June 2010 propose that if the consecutive eye appearances do not change much, it is evident that the user is focusing on the same fixation point. By clustering and averaging all the training video, a set of "fixation groups" is obtained, each composed of an averaged gaze probability map and its corresponding averaged eye image. These data are served to learn a Gaussian process regression (GPR). Due to the lack of the "true" positions of the gaze points (only the gaze probability is known instead), the training process of the GPR are done thanks to a Monte-Carlo approximation (i.e. samples are generated according to the averaged gaze probability map). However, this approach has some limits. Firstly, in order to go into operating mode, the system needs an off-line and time-consuming training beforehand (i.e. 10 minutes of training for a 10 minutes test). Secondly, the method makes use of many parameters that are empirically determined. Thirdly, in order for the Monte Carlo approximation to reach a desire accuracy, many samples are required at the expense of a significantly increasing computational cost. Nevertheless, the method only achieves a low accuracy of six degrees due to the fact that it is entirely based on saliency information which is not always reliable.

R. Valenti, N. Sebe, and T. Gevers, "What are you looking at? improving visual gaze estimation by saliency", International Journal of Computer Vision, 2012, discloses the use of saliency maps in a post-hoc processing stage to improve the performance of any gaze estimation systems. The foveated region is modelled as a Gaussian kernel around the estimated fixation point. The saliency map is then computed. A meanshift window which is initialized at the fixation point is used to find the closest maxima in the saliency map which is considered as the new corrected gaze point. By assuming that the error in a gaze tracker is identical and affine (e.g. shift or scale), the correction matrix can be obtained by applying a weighted least-square minimization between the estimated and the corrected gazes.

The existing eye gaze sensing systems are far from being widely used in consumer home applications because of two main reasons. The cost of such a system is still high and most systems require a cumbersome and time-consuming calibration procedure.

3. SUMMARY OF THE INVENTION

The purpose of the invention is to overcome at least one of these disadvantages of the prior art.

More specifically, the purpose of the invention is to determine the location of the gaze of a viewer on a screen he/she is watching at without any calibration.

The invention relates to a method for gaze estimation, comprising the steps of:
- detecting at least a location of the centre of at least an eye on at least an eye image of a viewer watching at least a video image displayed on a screen;
- determining at least a first position of the gaze of the viewer on the screen by using the at least a detected location of the centre of the at least an eye and a mapping function based on centre-bias property of human gaze distribution.

According to a particular characteristic, the detecting step comprises the steps of:
- converting the at least an eye image into at least a heat map;
- determining first pixels of the at least a heat map having an associated value greater than a first predetermined threshold value;
- determining second pixels located in the neighborhood of the first pixels having an associated value greater than a second predetermined threshold value;
- calculating the at least a location of the centre of the at least an eye as corresponding to a weighted average of the location of the first and second determined pixels.

Advantageously, the at least a heat map is represented in color space $YC_bC_r$ as output of the converting.

According to a specific characteristic, the detecting step further comprises a Gaussian filtering of the at least a heat map, the first and second pixels being determined after the Gaussian filtering.

Advantageously, the method further comprises the steps of:
- determining at least a second position of the gaze of the viewer on the screen according to at least a saliency map associated with the at least a video image;
- determining at least a third position of the gaze of the viewer on the screen, the at least a third position of the gaze corresponding to a fusion of the at least a first position of the gaze and the at least a second position of the gaze.

According to another characteristic, the at least a first position of the gaze is determined by using the particle filtering method and at least another first position of the gaze previously determined in a temporal point of view.

Advantageously, at least a third position of the gaze is determined by using the particle filtering method with at least another first position of the gaze and at least another second position of the gaze previously determined in a temporal point of view.

According to a particular characteristic, at least a first position of the gaze of the viewer is determined by taking into account a movement of the head of the viewer.

The invention also relates to a device configured for determining the gaze of a viewer, the device comprising at least one processor configured for:
- detecting a location of the centre of at least an eye on at least an eye image of a viewer watching at least a video image displayed on a screen, the at least an eye image comprising a representation of the at least an eye;
- determining at least a first position of the gaze of the viewer on the screen by using the detected location of the centre of the at least an eye and a mapping function based on centre-bias property of human gaze distribution.

Advantageously, the at least one processor is further configured for.
- converting the at least an eye image into at least a heat map;
- determining first pixels of the at least a heat map having an associated value greater than a first predetermined threshold value;
- determining second pixels located in the neighborhood of the first pixels having an associated value greater than a second predetermined threshold value;
- calculating the at least a location of the centre of the at least an eye as corresponding to a weighted average of the location of the first and second determined pixels.

According to a specific characteristic, the at least one processor is further configured for filtering said at least a heat map with a Gaussian filter.

According to another characteristic, the at least one processor is further configured for:
- determining at least a second position of the gaze of the viewer on the screen according to at least a saliency map associated with the at least a video image;
- determining at least a third position of the gaze of the viewer on the screen, the at least a third position of the gaze corresponding to a fusion of the at least a first position of the gaze and the at least a second position of the gaze.

Advantageously, the at least one processor is further configured for executing a particle filtering method.

According to another characteristic, the at least one processor is further configured for detecting a movement of the head of the viewer.

The invention also relates to a computer program product comprising instructions of program code for execution by at least one processor to perform the method for estimating the gaze, when the program is executed on a computer.

4. LIST OF FIGURES

The invention will be better understood, and other specific features and advantages will emerge upon reading the following description, the description making reference to the annexed drawings wherein.

Figure 6:
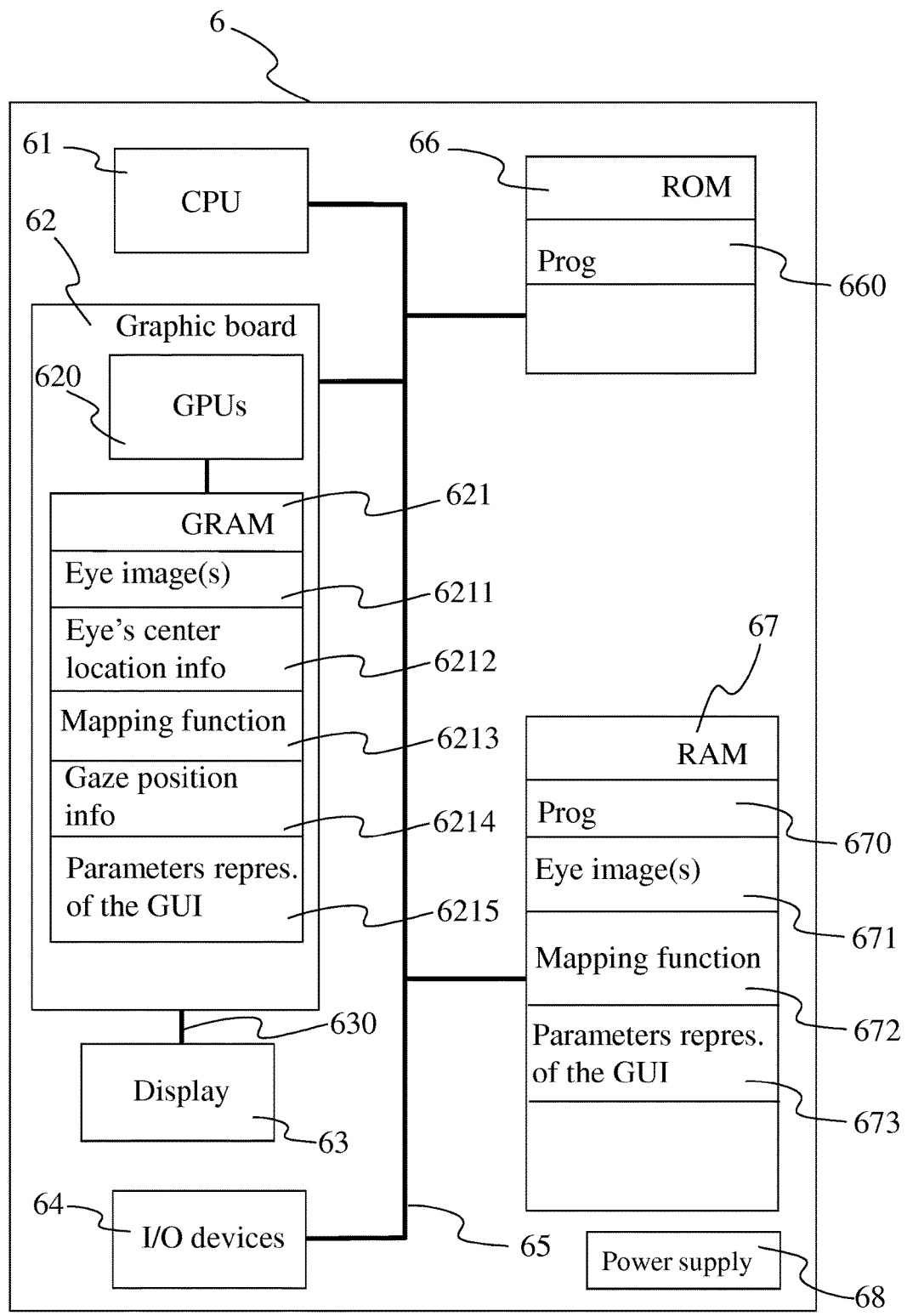
Figure 7:
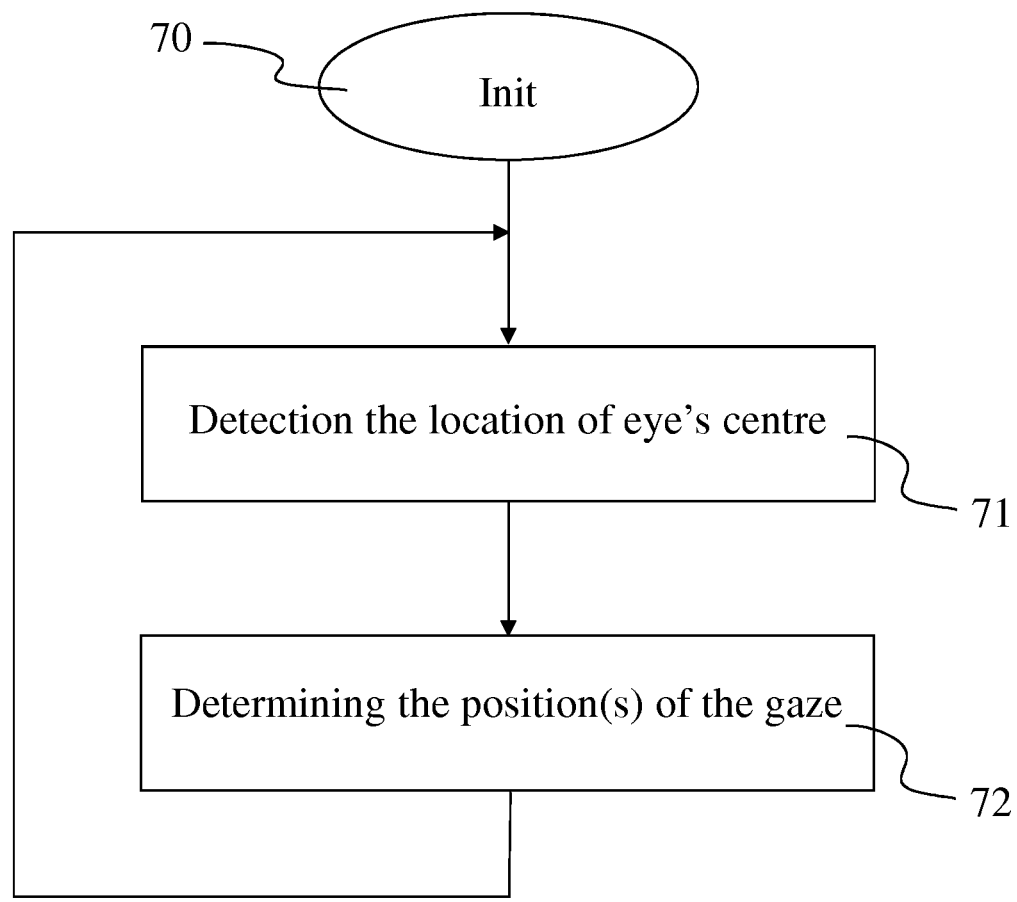

FIG. 6 diagrammatically shows a device implementing a method for estimating the position of the gaze, according to a particular embodiment of the invention;

FIG. 7 shows a method for estimating the position of the gaze, according to a particular embodiment of the invention.

5. DETAILED DESCRIPTION OF EMBODIMENTS OF THE INVENTION

The invention will be described in reference to a particular embodiment of a method for estimating the position of the gaze of a viewer watching at one or more video images displayed on a screen. To that aim, the location of the centre of one or both eyes of the viewer is detected by analyzing one or more images of at least a part of the viewer comprising a representation of one or both eyes of the viewer. The analyzed image corresponds advantageously to an image of the viewer while he/she is watching at one video image. A mapping function, representative of the mapping between eye appearances and gaze positions on the screen, and based on centre-bias property of the human gaze distribution is used to determine the position(s) of the gaze of the viewer on the screen.

The use of a mapping function based on centre-bias property of the human gaze distribution enables to avoid a calibration of the mapping function, i.e. to avoid any regression of the mapping function between the eye appearances and the gaze positions on the screen (for example performed by using test video images and associated eye image of the viewer watching at these test video images).

Figure 1:
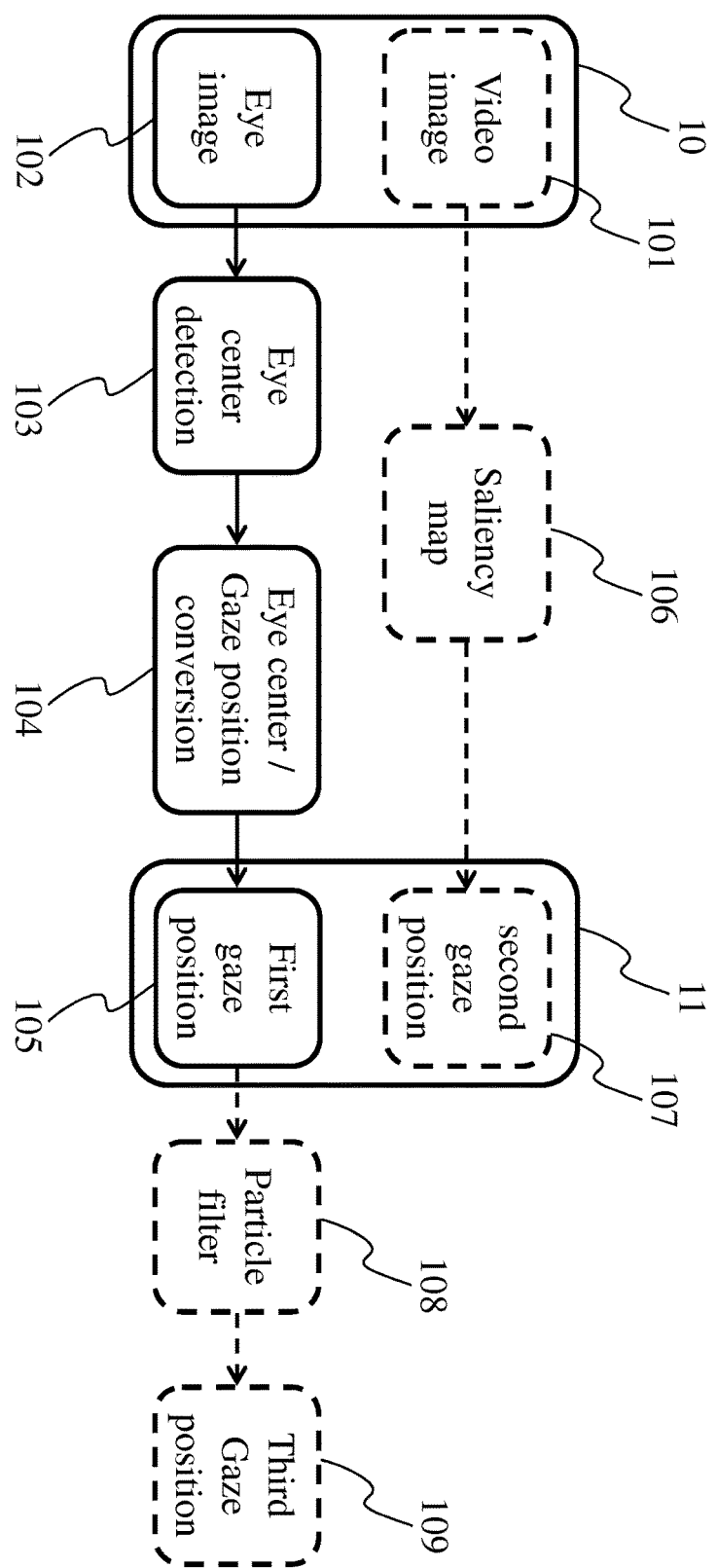
FIG. 1 shows a method for estimating the position of the gaze of a viewer, according to a particular embodiment of the invention.

FIG. 1 illustrates a method for estimating the position of the gaze of a viewer, according to a particular and non-limitative embodiment of the invention. The input 10 of the process comprises data representative of one or several video images 101 and data representative of one or several eye images 102. An eye image 102 corresponds advantageously to an image of one or both eyes of the viewer watching at the video image(s) 102, or more generally speaking to an image of the face of viewer from which data representative of the image(s) of the eye(s) may be extracted. In an advantageous way, the eye image(s) 102 is (are) acquired via a camera, for example a webcam. The camera is for example located on the top of the screen on which the video image(s) is (are) displayed, meaning that the camera is a device not integrated into the screen and connected to the screen with a wire or wirelessly. According to a variant, the camera is integrated into the screen. One eye image 102 is advantageously associated with one video image 101, meaning that one eye image 102 is shot while displaying the associated video image 101. The video image 101 corresponds for example to an image of a sequence of images (e.g. a movie), to a picture, to a web page, etc.

In a first step 103, the centre of one eye or the centre of each of the eyes is/are detected from the eye image 102. The face of the viewer may be detected by using a face detection algorithm, for example the boosted cascade face detector, as described in "Robust real-time object detection" by P. Viola and M. Jones, IJCV, vol. 57, no. 2, pp. 137-154, 2002. The rough positions of the eye regions are then determined from the detected face based on anthropometric relations. Empirically, it is found that eye centers are always contained within two regions starting from 20%×30% for the left eye and 60%×30% for right eye of the detected face region, with dimensions of 25%×20% of the detected face region.

According to a variant, the Hough Transform (HT) method is used for detecting the centre of the eye(s), the HT method detecting circles (and lines) in a parameter space using a voting-based algorithm. The HT method is for example described in the U.S. Pat. No. 3,069,654.

Figure 2:
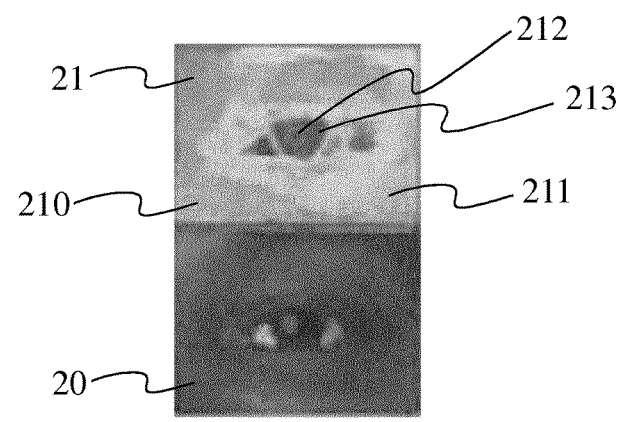
FIG. 2 shows an image of the eye of the viewer with an associated heat map, according to a particular embodiment of the invention.

In an advantageous way, the centre of the eye(s) is detected by using a method taking benefit of the color information available in the eye image(s) 102. According to this method:

1. The eye image captured in RGB color space is first converted into the YCbCr space.
2. Based on the empirical observations that pixels in pupil region usually have high values in Cb component and low values in Y and Cr components, an eye center heat map (HM) can be determined as follows:

$$HM(x,y)=Cb(x,y) \cdot (1-Cr(x,y)) \cdot (1-Y(x,y)) \quad (1)$$

where (x,y) corresponds to the coordinates of a pixel of the heat map, the heat map comprising advantageously as many pixels as the eye image from which the heat map is obtained, a pixel of the eye image with coordinates (x,y) having one corresponding pixel in the heat map with the same coordinates (x,y). Such a heat map is illustrated on FIG. 2, according to a specific and non limitative embodiment of the invention. FIG. 2 shows an eye image 20 and its associated heat map 21. Different values 210 to 213 are assigned to the pixels of the heat map, these values being computed from the equation 1.

3. All the sub-regions that may be the pupil region are then extracted using the region growing method. To do so, local maxima larger than a predefined threshold T1 are chosen as seed points, called first points 212. 4-connected regions around each seed point are then built by growing all pixels whose values are higher than a predefined threshold T2, these pixels being called second pixels 213. The selected points are then dynamically added to the set of "candidate points" and the process is continued until we go to the end of the eye region. Empirically, T1 and T2 may be for example set as follow: T1=0.98 and T2=0.85 to obtain good performance.
4. Finally, the eye center location $(x_c, y_c)$ is estimated by weighted voting of all candidate points:

$$(x_c, y_c) = \frac{\sum_{(x,y) \in PR} HM(x,y) \cdot (x,y)}{\sum_{(x,y) \in PR} HM(x,y)}. \quad (2)$$

Where PR is the set of candidate pixels.

Figure 3:
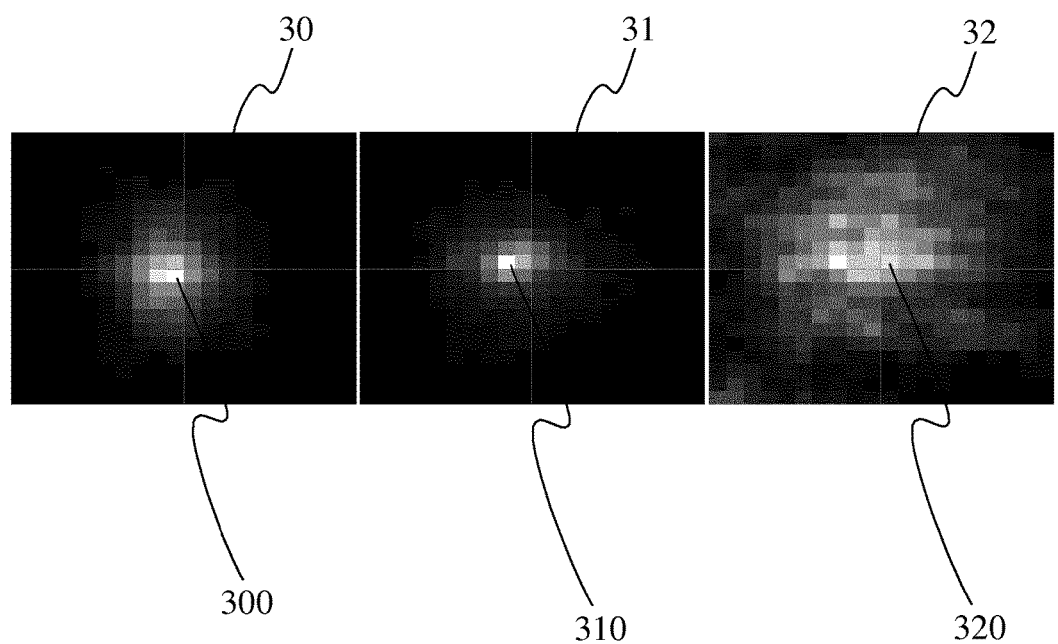
FIG. 3 shows average spatial histograms of gaze positions according to different types of video contents the viewer is watching at, according to a particular embodiment of the invention.

In a second step 104, the location of the centre(s) of the eye(s) is converted into the position of the gaze. The gaze distribution is indeed biased toward the center of the screen in free viewing mode. Such an effect may be observed in FIG. 3. In FIG. 3, average spatial histograms of gaze positions recorded by a gaze tracker (for example a SMI RED tracker with a sampling frequency of 50 Hz) when viewers are in three screen viewing activities: movie watching 30, television watching 31 and web browsing 31. For the two first activities 30 and 31, for example 4 observers are asked to watch 8 video sequences (i.e., 4 movie clips and 4 television clips, each of 10 minutes). For the web browsing activity, the viewers are free to choose 5 favorite web sites to browse during 10 minutes. The results are then averages on all stimuli and all subjects. A strong center-bias effect may be observed for the movie and television viewing activities when the gaze positions (bright pixels 300 and 310) are distributed in a very narrow region located at the middle of the screen. For the web browsing activity, the center-bias is also noticeable despite a large dispersion of gaze distribution around the center (bright pixels 320).

Based on this statistic property of the gaze distribution, the "observed gaze" position $\hat{g}_t=(\hat{x}_{gt}, \hat{y}_{gt})$ (normalized into [0 1]) may be determined from the current eye center coordinates $(x_c, y_c)$ (in the eye image) by the following projection model:

$$\hat{x}_g = 0.5 + 0.5 \frac{x_c - \bar{x}_c}{A_x \sigma_{x_c}}, \quad (3)$$

and $$\hat{y}_g = 0.5 + 0.5 \frac{y_c - \bar{y}_c}{A_y \sigma_{y_c}}, \quad (4)$$

where:
  $\hat{x}_g$ and $\hat{y}_g$ are the converted gaze positions, corresponding to the first position 105 of the gaze;
  $x_c$ and $y_c$ are the current eye center positions in absolute image coordinates. Since the subject's head is supposed to be fixed, we do not require an eye corners localization technique to convert these values into relative positions of eye coordinates;
  $\bar{x}_c, \bar{y}_c, \sigma_{xc}$ and $\sigma_{yc}$ are respectively the mean values and the standard deviation values of $x_c$ and $y_c$. These parameters are continuously computed and updated during the process;
  $A_x$ and $A_y$ are tuning factors which describe the "scales" of the gaze distribution. They are empirically set to for example 4 that is large enough to quantify the center-bias level.

By this way, the gaze position will be at the center of the screen $((x_g, y_g)=(0.5, 0.5)$ in the normalized gaze coordinates) when the current eye center position is equal to its mean value $((x_c, y_c)=(\bar{x}_c, \bar{y}_c))$ and the gaze will be at the screen borders (i.e., $(x_g, y_g)=1$) when the current eye center position is deviated $A_x$, (respectively $A_y$) times the standard deviations from its mean values.

The use of such a simple mapping model enables to get a coarse estimation of the gaze position (while giving good performance) from the eye image, independently of (i.e. without) the saliency map.

In an optional way and according to a variant, the estimation of the gaze position may be refined by using saliency map(s) 106 associated with the video image(s) 101. A second gaze position 107 may then be obtained from the saliency map(s). By fusing the first gaze position 105 with the second gaze position 107, a third gaze position 109 may be obtained, which has the advantage of being finer than the first gaze position 105 and the second gaze position 107 taken alone. The third gaze position 105 corresponds advantageously to the average of the first gaze position and the second gaze position. According to a variant, the third gaze position 105 corresponds advantageously to the weighted average of the first gaze position and the second gaze position, the weight assigned to the first gaze position being greater than the weight assigned to the second gaze position if the confidence in the estimation of the first gaze position is greater than the confidence in the estimation of the second gaze position, and inversely. According to another variant, the saliency map is used as to adapt the tuning factors $A_x$ and $A_y$. For example, $A_x$ and $A_y$ are adapted according to the dispersions in the saliency map, i.e. according to the variance of the saliency map.

Figure 4:
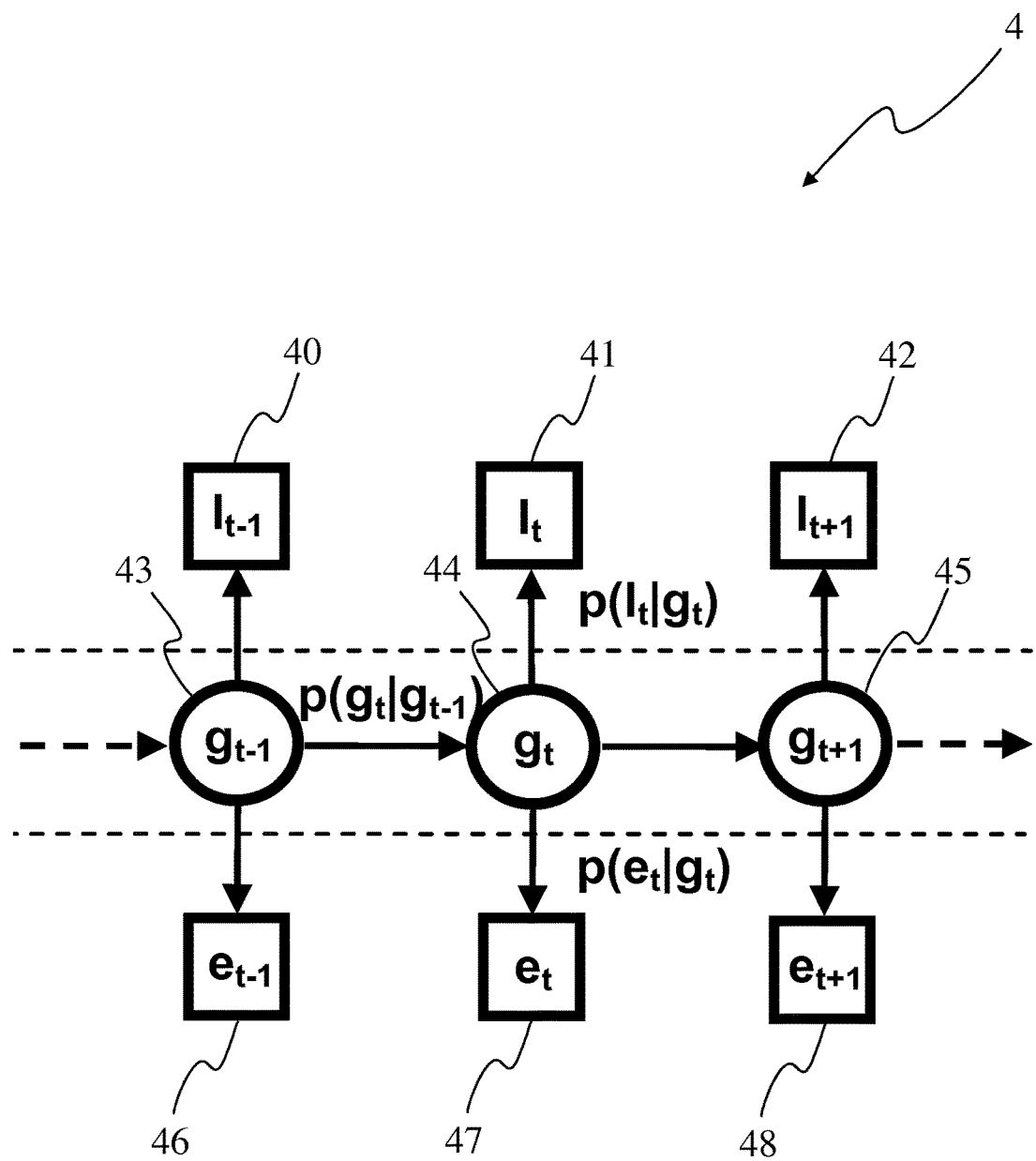
FIG. 4 shows a particle filtering framework applied to the estimation of the position of the gaze of the viewer of FIG. 1, according to a particular embodiment of the invention.

According to another optional variant, a particle filter 108 may be implemented, based on the first gaze position 105 and second gaze position 107, as to obtain a much finer third gaze position 109. Such a variant is illustrated on FIG. 4 that shows a particle filtering framework applied to the estimation of the position of the gaze of the viewer, according to a particular and non-limitative embodiment of the invention. From the most general viewpoint and according to a specific exemplar embodiment of the invention, a gaze sensing system receives as input two sources of information, the visual content (e.g., image/video) and the viewer's appearance (e.g., head pose or eye appearance), and outputs the most probable gaze points, i.e. the third gaze position 109. The probabilistic relationships between the stimulus image I 40, 41 and 42 (corresponding to the video image(s) 101 at different consecutive times t−1, t and t+1)), the gaze position g=(x, y) (where g is a 2D vector, x and y are the gaze positions on horizontal and vertical axes, respectively) 43, 44, 45 at the different consecutive times t−1, t and t+1 and the eye image e 46, 47, 48 (corresponding to the eye images 103 at the different consecutive times t−1, t and t+1) may be illustrated via a probabilistic graphical model 4 as shown in FIG. 4. This graphical model 4 describes a DBN (Dynamic Bayesian Network) in which the nodes in each time-frame t−1, t and t+1 represent the relationship between the considered random variables and the directed edges represent their conditional dependencies. Nodes which are not connected are said to be "conditionally independent" of each other. The links between time frames reflect the temporal relationships. Based on this DBN, the gaze position is estimated as the posterior probability $p(g_t|I_{1:t}, e_{1:t})$. As it can be seen in FIG. 4, the eye appearance $e_t$ 47 is not fully independent of the stimulus $I_t$ 41. It is clear that the stimulus somehow has an impact on the gaze position $g_t$ 44 and hence, indirectly affect the eye appearance. However, without loss of generality, these two observations may be considered as "conditionally independent" (i.e., dependent via third variable $g_t$). Also, the gaze position distribution is assumed to follow a first-order Markov process, i.e., the current state only depends on the previous state. This assumption is strongly valid for fixation and smooth-pursuit eye movements. In a saccadic eye movement, the current gaze position may also be considered as dependent on the previous gaze position if it is modeled by a distribution having a sufficiently large scale. By using the Bayes' rule as well as some factorizations, it is obtained:

$$p(g_t|I_{1:t}, e_{1:t}) \propto p(I_t, e_t|g_t) p(g_t|I_{1:t-1}, e_{1:t-1}). \quad (5)$$

In this equation 5, the posterior probability $p(g_t|I_{1:t}, e_{1:t})$ may be estimated via prior probability $p(g_t|I_{1:t-1}, e_{1:t-1})$ (the prediction of the current state $g_t$ given the previous measurements) and the likelihood $p(I_t, e_t|g_t)$. The sign $\propto$ means "being proportional to". Applying the chain rule (i.e., Chapman-Kolmogoroff equation) on the prior probability, we have a familiar result as follows:

$$p(g_t|I_{1:t},e_{1:t})=p(I_t,e_t|g_t)\cdot\int p(g_t|g_{t-1})p(g_{t-1}|I_{1:t-1},e_{1:t-1})dg_{t-1}. \quad (6)$$

Equation 6 characterizes a dynamic system with one state variable g and two simultaneous measurements I and e. Under linear conditions and Gaussian assumptions on the state noise and measurement noise, an optimal solutions in closed-form expression may be obtained by using the Kalman filter method. In contrast, the particle filtering framework is adopted as a suboptimal alternative to tackle the problem regardless of the underlying distribution. In addition, the particle filter provides a more multimodal framework that allows to integrate observations of different types (i.e., different distributions). Particle filtering based methods approximate the posterior probability density $p(g_t|o_{1:t})$ (where o indicates the observations which are either the stimulus image/or the eye appearance e) via two steps:

1. Prediction: the current state is predicted from the previous observations $o_{1:t-1}$ $$p(g_t|o_{1:t-1})=\int p(g_t|g_{t-1})p(g_{t-1}|o_{1:t-1})do_{t-1}. \quad (7)$$

2. Update: the estimation of the current state is updated with the incoming observation $y_t$ using the Bayes' rule $$p(g_t|o_{1:t})\propto p(o_t|g_t)p(g_t|o_{1:t-1}). \quad (8)$$

The posterior distribution $p(g_t|o_{tt})$ is approximated by a set of N particles $\{g_t^i\}i=1, \ldots, N$ associated to their weight $w_t^i$. Usually, it is not possible to draw samples from $p(g_t|o_{1:t})$ directly, but rather from the so-called "proposal distribution" $q(g_t|g_{1:t-1},o_{1:t})$ for which q(.) may be chosen under some constraints. The weights are undated by:

$$w_t^i = w_{t-1}^i \frac{p(o_t \mid g_t^i)p(g_t^i \mid g_{t-1}^i)}{q(g_t^i \mid g_{1:t-1}^i, o_{1:t})}. \quad (9)$$

In the simplest scenario, $p(g_t|g_{t-1})$ is chosen as the proposal distribution resulting in a bootstrap filter with an easy implementation. In this way, weight updating is simply reduced to the computation of the likelihood. In order to avoid degeneracy problem, resampling may also been adopted according to a variant as to replace the old set of particles by the new set of equally weighted particles according to their important weights.

In order to apply the particle filter framework, a state transition model and an observation model are modeled as described hereinbelow.

A. State Transition Model

In general, there are two types of eye movements: smooth pursuit and saccade. The former denotes a gradual movement which typically occurs when one focuses on a moving object while the latter is a very fast jump from one eye position to another. Other types of eye movement such as fixation or vergence for instance, can be loosely classified into these two types.

Intuitively, smooth-pursuit eye movements can be successfully modeled by a distribution whose peak is centered at the previous gaze position state $g_{t-1}$ (e.g., Gaussian distribution). Otherwise, for a saccadic eye movement i.e., a movement to an arbitrary position on the screen, another Gaussian distribution centered at the previous gaze position can also be used but with a much larger scale to describe the uncertainty property of the saccade.

Hence, the state transition should be modeled by a Gaussian mixture of two densities. However, for the sake of simplicity, a unique distribution for both types of eye movement is adopted:

$$p(g_t|g_{t-1})=N(g_{t-1};\text{diag}(\sigma^2)). \quad (10)$$

where $\text{diag}(\sigma^2)$ is the diagonal covariance matrix which corresponds to the variance of each independent variable $x_t$ and $y_t$ (the gaze point being denoted as a two dimensional vector $g_t=(x_t, y_t)$).

$\sigma^2$ needs to be large enough to cover all possible ranges of the gaze on the display in order to model the saccadic eye movement, $\sigma$ is for example set at $\sigma=\frac{1}{3}$ the screen dimensions.

B. Observation Model

Since $I_{1:t}$ and $e_{1:t}$ are conditionally independent (as it is seen in FIG. 4), the compound likelihood $p(I_t, e_t|g_t)$ may be given by:

$$p(I_t,e_t|g_t)=p(I_t|g_t)p(e_t|g_t)\propto p(g_t|I_t)p(g_t|e_t). \quad (11)$$

The first term $p(g_t|I_t)$ represents the gaze probability given only the image frame which can be directly obtained from the saliency map. The second term $p(g_t|e_t)$ denotes the likelihood distribution given the current eye image. In the context of object tracking, this likelihood is often computed by a similarity measure between the current observation and the existing object model. In line with these works, in the context of gaze estimation, we model the likelihood $p(g_t|e_t)$ as follows:

$$p(g_t|e_t)\propto\exp(-\lambda d(e_t)). \quad (12)$$

where $\lambda$ is the parameter which determines the "peaky shape" of the distribution and $d(e_t)=\|e_t-\hat{e}_t\|_2$ denotes a distance measure between the current observation $e_t$ and the estimated eye image $\hat{e}_t$ (corresponding to the particle position $\hat{g}_t$).

In a calibration-free context, there is no access to training set of eye images to estimate $\hat{e}_t$. Hence, a simple model to estimate $p(g_t/e_t)$ is proposed, via detection of the location of eye center. This estimation goes through the two steps described hereinabove: i) detection 103 of the location of the centre of the eye(s) and ii) conversion 104 of the centre of the eye(s) into first gaze position.

More precisely, the likelihood value $p(g_t/e_t)$ given the observation $e_t$ is exponentially proportional to the distance between $g_t$ and the "observed gaze position" $\hat{g}_{et}$ which is derived from the eye center location via equations 3 and 4:

$$p(g_t|e_t)\propto\exp(-\lambda\|g_t-\hat{g}_{et}\|_2) \quad (13)$$

The parameter $\lambda$ in equation 13 is determined such that $p(g_t/e_t)\approx\varepsilon$ (where $\varepsilon$ is a very small positive number, for example $10^{-2}$ or $10^{-3}$) when $\|g_t-\hat{g}_t\|_2=D$ where D is the possibly largest error, generally set to the diagonal of the screen.

Figure 5:
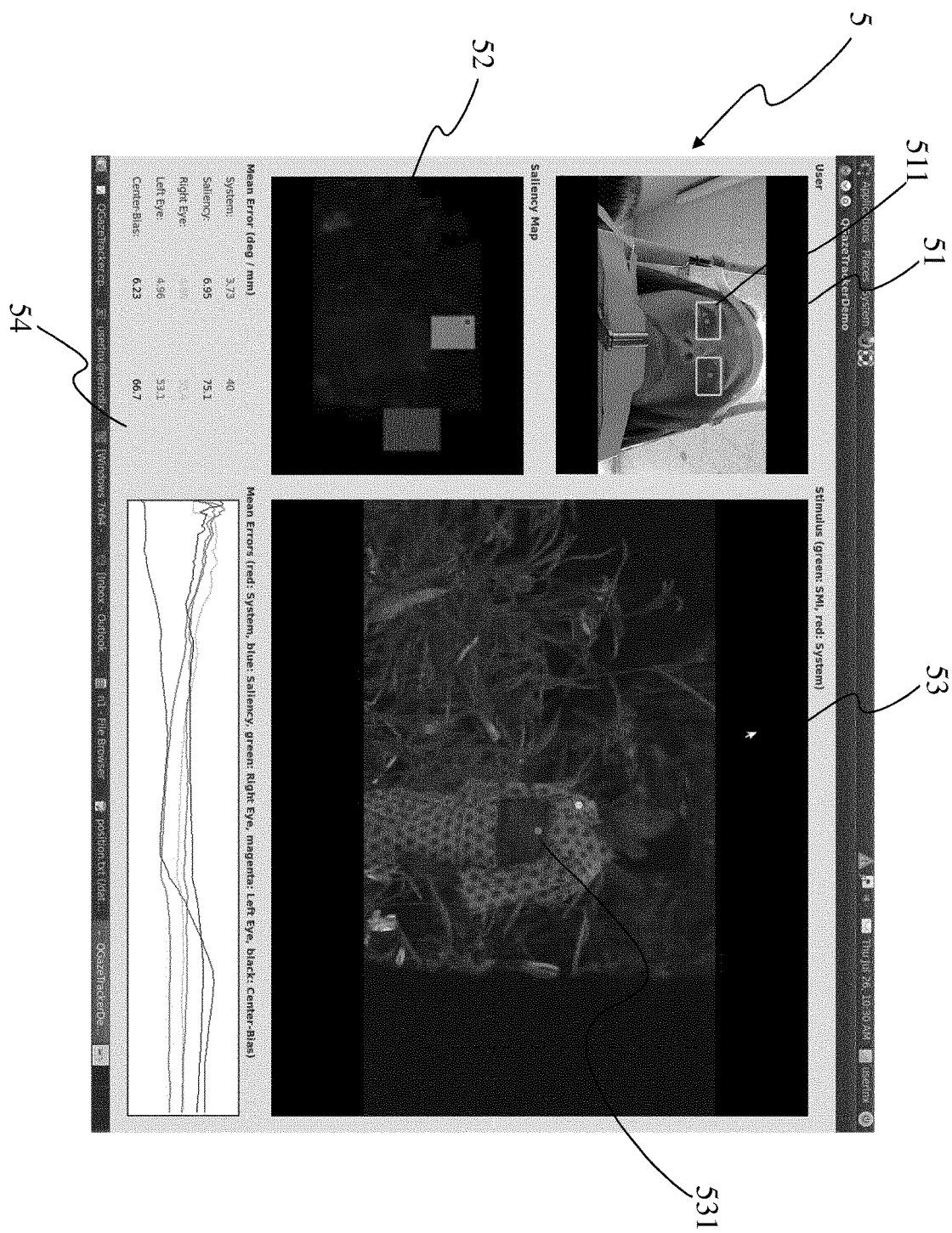
FIG. 5 shows a graphical user interface related to the method for estimating the position of the gaze, according to a particular embodiment of the invention.

FIG. 5 illustrates a graphical user interface 5 (GUI) adapted to assist a user in controlling the result of the estimation of the gaze position, according to a particular and non-limitative embodiment of the invention. The GUI 5 comprises a first part 51 for displaying an image of the face of the viewer who is watching at a video image, also called stimulus image. A frame 511 may be generated as to graphically show the part of the image of the face of the viewer corresponding to an eye of the viewer. Advantageously, the centre of the eye may also been graphically identifier, for example via a red point. This may enable to check that the detection of the centre of the eye works well. The video image the viewer is watching at is displayed into a second part 53 of the GUI 5. The first gaze position is advantageously showed on the video image 53 with a specific graphical identifier 531, for example a red point. The user may then check with the viewer if the position of the graphical identifier corresponds actually to the part of the video image 53 the viewer is watching at. Naturally, the user and the viewer may be one and a same person. A third part 52 of the GUI illustrates the saliency map corresponding to the video image displayed in the second part 53 of the GUI 5. The maximum salient peak is advantageously graphically identified on this third part 52, for example via a blue point. According to a variant, the second gaze position may also been identified on the video image 53, for example with the same graphical identifier that on the third part 52. According to another variant, the third gaze position, corresponding to the fusion of the first gaze position and of the second gaze position, is also illustrated on the video image 53, for example via a yellow point. The GUI 5 also comprises a fourth part 54 showing curves representative of the evolution of the mean error over time (for example in degree per millimeter) for each configuration (i.e. detection of the centre of the right eye, detection of the centre of the right eye, estimation of the first gaze position, estimation of the second gaze position and estimation of the third gaze position), one specific color being used for each curve.

The GUI 5 enables a user (and/or the viewer) to see directly on the screen the results of the different detection and estimation performed by the system, as well as to visually check the validity of the results.

FIG. 6 diagrammatically illustrates a hardware embodiment of a device 6 configured for determining the gaze of a viewer watching at a video image on a screen, according to a particular and non-limitative embodiment of the invention. The device 6 is also configured for the creation of display signals of one or several images, for example images representative of the Graphical User Interface 5. The device 6 corresponds for example to a personal computer (PC), a laptop, a tablet, a Smartphone, a games console or a multimedia terminal.

The device 6 comprises the following elements, connected to each other by a bus 65 of addresses and data that also transports a clock signal:
  a microprocessor 61 (or CPU),
  a graphics card 62 comprising:
    several Graphical Processor Units (or GPUs) 620,
    a Graphical Random Access Memory (GRAM) 621,
  a non-volatile memory of ROM (Read Only Memory) type 66,
  a Random Access Memory or RAM 67,
  one or several I/O (Input/Output) devices 64 such as for example a keyboard, a mouse, a webcam, and
  a power source 68.

The device 6 also comprises a display device 63 of display screen type directly connected to the graphics card 62 to display synthesized images calculated and composed in the graphics card, for example live. The use of a dedicated bus to connect the display device 63 to the graphics card 62 offers the advantage of having much greater data transmission bitrates and thus reducing the latency time for the displaying of images composed by the graphics card. According to a variant, a display device is external to the device 6 and is connected to the device 6 by a cable or wirelessly for transmitting the display signals. The device 6, for example the graphics card 62, comprises an interface for transmission or connection (not shown in FIG. 6) adapted to transmit a display signal to an external display means such as for example an LCD or plasma screen or a videoprojector.

It is noted that the word "register" used in the description of memories 621, 66, and 67 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 61 loads and executes the instructions of the program contained in the RAM 67.

The random access memory 67 notably comprises:
  in a register 670, the operating program of the microprocessor 61 responsible for switching on the device 6,
  data 671 representative of one or several eye images acquired by a camera or received, wirelessly or via a cable, from another device;
  parameters 672 representative of the mapping function, for example statistical properties of the human gaze distribution according to the viewed content;
  parameters 673 representative of a Graphical User Interface.

The algorithms implementing the steps of the method specific to the invention and described hereafter are stored in the memory GRAM 621 of the graphics card 62 associated with the device 6 implementing these steps. When switched on and once the data 671 representative of the eye image(s) and the parameters 672 representative of the mapping function (as well as the parameters 673 representative of the GUI according to an optional variant) are loaded into the RAM 67, the graphic processors 620 of the graphics card 62 load these parameters into the GRAM 621 and execute the instructions of these algorithms in the form of microprograms of "shader" type using HLSL (High Level Shader Language) language or GLSL (OpenGL Shading Language) for example.

The random access memory GRAM 621 notably comprises:
  in a register 6211, the data of the eye image(s);
  in a register 6212, parameters representative of the location of the centre of the eye(s) (for example the coordinates of the centre(s));
  in a register 6213, the parameters representative of the mapping function;
  in a register 6214, parameters representative of the first gaze position (for example the coordinates x,y of the gaze position); according to a variant, parameters representative of the second and third gaze position are stored in the register 6214 or in other registers;
  in a register 6215, the parameters representative of the GUI.

According to a variant not illustrated on FIG. 6, the GRAM also comprises in registers data representative of saliency map(s) associated with video image(s) (which is (are) associated with the eye image(s)) as well as parameters representative of the maximum salient peak(s), parameters representative of the second gaze position(s) and parameters representative of the third gaze position(s).

According to a variant, the data 671 of the eye image(s) and the parameters 672 representative of the mapping function are not loaded into the GRAM 621 and are processed by the CPU 61. According to this variant, parameters representative of the location of the centre of the eye(s) and the parameters representative of the first gaze position (as well as the parameters representative of the second and third gaze position when computed) are stored in the RAM 67 and not in the GRAM 621.

According to another variant, the power supply 68 is external to the device 6.

FIG. 7 illustrates a method for estimating the gaze position of a viewer implemented in the device 6, according to a non-restrictive advantageous embodiment of the invention.

During an initialisation step 70, the different parameters of the device 6 are updated.

Then during a step 71, the location(s) of the centre of the eye(s) of a viewer watching at a video content displayed on a screen is (are) detected. The video content displayed on the screen may be any video image or sequence of video images or any content comprising textual and/or graphical elements, like a web page, a picture, etc. The location of the centre of the eye(s) is detected by analyzing one or more images of the eye(s) of the viewer, acquired for example with a webcam while the viewer is watching at the video image(s). The image(s) of the eye(s) may be an image of the face of the viewer in which the eye(s) are detected in any way known by the skilled person in the art. The location(s) of the centre of the eye(s) is for example detected by using the Hough Transform (HT) method or any method based on edge (gradient) detection and/or machine learning algorithm.

According to an advantageous variant, the location of the centre of the eye(s) is detected by converting the eye image(s) (i.e. the part(s) of the image(s) of the viewer comprising the eye(s)) into heat map(s), one heat map being associated with one eye image. A heat map corresponds advantageously to a conversion of a RGB eye image into a pixel image represented in the $YC_bC_r$ color space. According to a variant, the heat map corresponds to a conversion of the RGB eye image into a pixels image represented in the YUV color space or in the RGB color space. A value computed for example with the equation 1 is associated with each pixel of the heat map. First pixels 212 of the heat map having an associated value greater than a first threshold value T1 (for example equal to any value comprised between 0.98 and 1) are selected, which coordinates are for example stored in a memory of the RAM-type or GRAM-type. Second pixels 213 belonging to the neighborhood of the first pixels are then selected, the selected second pixels being the pixels of the neighborhood of the first pixels having an associated value greater than a second threshold value T2 (for example equal to any value comprised between 0.90 and 0.95), which coordinates are for example stored in a memory of the RAM-type or GRAM-type. The coordinates of the centre of the eye(s) are then determined as being a weighted average of the coordinates of the first and second pixels, by using for example equations 3 and 4. Advantage of this variant based on color cues is that the method is simple and computation implied by this variant is quick, which enable for example real-time implementation.

According to another variant, the heat map(s) obtained from the conversion of the eye image(s) is (are) filtered, for example with a Gaussian filter or the extended Kalman filter before the determination of the first and second pixels used for computing the location(s) of the centre of the eye(s). Such a filtering enables to eliminate some noises from the heat map which is smoothes by the filtering. The use of a Gaussian filter has the advantage of stabilizing the detection result(s) (i.e., avoiding wrong detection due to for example eyelid, eye glass, reflexion).

Then during a step 72, a first position of the gaze of the viewer is determined by using the detected location of the centre of the eye as described hereinabove with regard to step 71 and by using a mapping function based on centre-bias property of human gaze distribution. The use of such a mapping function with the detected location of the centre of the eye enables to avoid the need of calibrating the system used for determining the gaze position, such a calibration being usually to be performed by the user before any determination of the gaze (for example with a series of test images).

According to a variant, the determination of the first gaze position is refined by using a second gaze position determined by using the saliency map computed from the video image the viewer is watching at when the first position of the gaze is determined. A third position of the gaze resulting from a combination/fusion of the first gaze position and the second gaze position is then obtained. The third gaze position is for example computed by averaging the first and second gaze positions or by averaging the first and second gaze positions to which are assigned different weights. According to another variant, the variance of the saliency map is used as to adapt parameters of the equation used for determining the first gaze position. The expression "fusion" of the first gaze position and of the second gaze position may be interpreted as meaning averaging, weighted averaging or adapting parameters used for computing the first gaze position.

According to a variant, a particle filtering is implemented as to determine the first gaze position, the particle filtering enabling to take into account the result(s) of first gaze position previously determined (in a temporal point of view) when computing a current first gaze position.

According to another variant, the particle filtering method is implemented by using the determination of the first gaze position and also the determination of the second gaze position.

According to a further variant, the movement(s) of the head of the viewer is (are) taken into account when determining the first position of the gaze of the viewer. A head movement is for example detected when the difference between a current eye centre location and its mean values are sufficiently large, for example:

$$\sqrt{x_c^2 + y_c^2} - \sqrt{\overline{x_c}^2 + \overline{y_c}^2} > T$$

Where T is set proportionally to the distance between the user and the display which may be implicitly derived via size of the detected viewer's face.

When a head movement is detected, the eye centre location (i.e. the means values ($\overline{x}_c$, $\overline{y}_c$) and the standard deviation ($\sigma_{x_c}$, $\sigma_{y_c}$) is re-initialized to 0.

Steps 71 and 72 are advantageously reiterated for each newly received or acquired eye image.

Naturally, the invention is not limited to the embodiments previously described.

In particular, the invention is not limited to a method for but also extends to any device implementing this method and notably any devices comprising at least one CPU and/or at least one GPU. The implementation of calculations necessary to the implementation of the method's steps is not limited either to an implementation in shader type microprograms but also extends to an implementation in any program type, for example programs that can be executed by a CPU type microprocessor.

The invention also relates to a method (and a device configured) for estimating the likelihood of the gaze. The invention further relates to a method for adapting the content of the video image(s) watched by the viewer according to the result(s) of the determined gaze position(s) or to a method for controlling a user interface with the eye by using the determined gaze position.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data rules for writing or reading the syntax of a described embodiment, or to carry as data actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The present invention may be used in real-time applications. The device 6 described with respect to FIG. 6 is advantageously equipped with interaction means such as a keyboard a mouse, a joystick or any other modes for introduction of commands, vocal recognition being for instance also possible.

The invention claimed is:

1. A method of gaze estimation, the method comprising:
converting at least an eye image of a viewer watching at least a video image displayed on a screen into at least a heat map;
detecting at least a location of a centre of at least an eye on the at least a heat map;
converting the detected at least a location of the centre of the at least an eye into at least a first position of the gaze of the viewer on said screen by using a mapping function based on centre-bias property of human gaze distribution.

2. The method according to claim 1, wherein the detecting step further comprises:
determining first pixels of the at least a heat map having an associated value greater than a first determined threshold value;
determining second pixels located in the neighbourhood of the first pixels having an associated value greater than a second determined threshold value;
computing the at least a location of the centre of the at least an eye as corresponding to a weighted average of the location of the first and second determined pixels.

3. The method according to claim 2, wherein the at least a heat map is represented in color space $YC_bC_r$ as output of the converting.

4. The method according to claim 2, wherein said detecting step further comprises a Gaussian filtering of said at least a heat map, the first and second pixels being determined after the Gaussian filtering.

5. The method according to claim 1, wherein the method further comprises:
determining at least a second position of the gaze of the viewer on said screen according to at least a saliency map associated with the at least a video image;
determining at least a third position of the gaze of the viewer on said screen, the at least a third position of the gaze corresponding to a fusion of the at least a first position of the gaze and the at least a second position of the gaze.

6. The method according to claim 5, wherein said at least a third position of the gaze is determined by using a particle filtering method with at least another first position of the gaze and at least another second position of the gaze previously determined in a temporal point of view.

7. The method according to claim 1, wherein the at least a first position of the gaze is determined by using a particle filtering method and at least another first position of the gaze previously determined in a temporal point of view.

8. The method according to claim 1, wherein said at least a first position of the gaze of the viewer is determined by taking into account a movement of the head of the viewer.

9. A non-transitory processor readable medium having stored therein instructions for causing a processor to perform at least the method according to one of claims 1 to 8.

10. A device configured for determining the gaze of a viewer, the device comprising at least one processor configured for:
  converting at least an eye image of a viewer watching at least a video image displayed on a screen into at least a heat map;
  detecting a location of a centre of at least an eye on the at least a heat map;
  converting the detected location of the centre of the at least an eye into at least a first position of the gaze of the viewer on said screen by using a mapping function based on centre-bias property of human gaze distribution.

11. The device according to claim 10, wherein the at least one processor is further configured for:
  determining first pixels of the at least a heat map having an associated value greater than a first determined threshold value;
  determining second pixels located in the neighbourhood of the first pixels having an associated value greater than a second determined threshold value;
  computing the at least a location of the centre of the at least an eye as corresponding to a weighted average of the location of the first and second determined pixels.

12. The device according to claim 11, wherein the at least a heat map is represented in color space YCbCr as output of the converting.

13. The device according to claim 10, wherein the at least one processor is further configured for filtering said at least a heat map with a Gaussian filter.

14. The device according to claim 10, wherein the at least one processor is further configured for:
  determining at least a second position of the gaze of the viewer on said screen according to at least a saliency map associated with the at least a video image;
  determining at least a third position of the gaze of the viewer on said screen, the at least a third position of the gaze corresponding to a fusion of the at least a first position of the gaze and the at least a second position of the gaze.

15. The device according to claim 14, wherein said at least a third position of the gaze is determined by using a particle filtering method with at least another first position of the gaze and at least another second position of the gaze previously determined in a temporal point of view.

16. The device according to claim 10, wherein said at least one processor is further configured for detecting a movement of the head of the viewer.

17. The device according to claim 10, wherein the at least a first position of the gaze is determined by using a particle filtering method and at least another first position of the gaze previously determined in a temporal point of view.

* * * * *